Patented May 1, 1951

2,551,316

UNITED STATES PATENT OFFICE 2,551,316

9-AMINOALKYL 9-ALKANOYL 9,10 DIHYDRO-ANTHRACENES

John W. Cusic, Skokie, Ill., assignor to G. D. Searle & Co., Skokie, Ill., a corporation of Illinois No Drawing. Application February 20, 1948, Serial No. 9,969

14 Claims. (Cl. 260—501)

This invention relates to 9-aminoalkyl-9-acyl-9,10-dihydroanthracenes, to salts thereof, and to processes for preparing such compounds. More specifically, this invention pertains to 9-aminoalkyl-9-alkanoyl-9,10-dihydroanthracenes having the following general formula

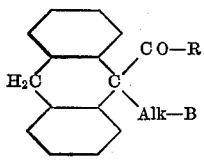

wherein R is an alkyl radical, Alk is an alkylene radical and B is an organic amino radical which is aliphatic in nature and character.

In the compounds of the foregoing formula, R represents alkyl radicals of one to five carbon atoms, such as methyl, ethyl, propyl, isopropyl, n-butyl, isobutyl, n-amyl, isoamyl, and the like. The alkylene grouping, Alk, is a bivalent radical derived from a saturated hydrocarbon. It represents ethylene, propylene, trimethylene, tetramethylene, the butylene, and related radicals, as well as alkylated derivatives of these radicals. Preferably the alkylene radical has 2, 3, or 4 carbon atoms between the dihydroanthracene nucleus and the amino group, B. The amino radical, B, is derived from a primary or secondary organic amine (i. e., an atertiary organic amine) which is aliphatic in character. It therefore includes the monoalkylamino and the dialkylamino radicals. It includes amino radicals derived from aliphatic-type amines such as morpholine, piperidine, pyrrolidine, thiamorpholine, lupetidine, and the like. It also includes alkanolamino radicals such as the ethanolamino, diethanolamino, isopropanolamino, β-hydroxyethylmethylamino, β-hydroxypropylethylamino, and related radicals. It will be seen that the amino radical, B, is derived from primary and secondary organic amines which have ionization constants in the range of $10^{-3}$ to $10^{-6}$.

The substances which comprise this invention can be produced by the aminoalkylation of a 9-acyl-9,10-dihydroanthracene. The 9-acyl-9,10-dihydroanthracenes are readily available or can be prepared by the reaction of 9,10-dihydroanthracene with an acyl halide in the presence of a Friedel-Crafts catalyst in an inert solvent. For the aminoalkylation reaction an aminoalkyl halide, of the general formula B-Alk-X, is used, wherein B and Alk have the meanings given hereinabove and X represents a halogen, preferably a middle halogen, i. e., bromine or chlorine. The reaction is carried out in the presence of an alkali metal hydride, amide or tertiary alkoxide, such as sodium hydride, lithium hydride, sodamide, potassium amide, potassium tertiary-butoxide, sodium tertiary-amyloxide, and the like. An inert solvent is used, such as benzene, toluene, other hydrocarbons boiling between 80° C. and 150° C., and ethers having a similar boiling range.

The organic bases of the type contemplated in this application are soluble in common organic solvents but generally insoluble in water. For the purpose of water solubility, they are preferably converted to salts with organic and inorganic acids, such as sulfuric, phosphoric, citric, tartaric, sulfamic, lactic, acetic, malic, maleic, hydrochloric, hydrobromic, succinic, and the like.

They may also be converted to quaternary ammonium salts by treatment with a reactive organic ester such as methyl iodide, ethyl bromide, methyl chloride, benzyl chloride, dimethyl sulfate, methyl toluenesulfonate, and the like. The addition salts of the bases with acids have the same physiologic properties as the free bases and are equally desirable from a therapeutic point of view. It is understood that the appended claims read on the basically substituted 9,10 - dihydroanthracene compounds defined therein whether they be in the form of the free bases or salts thereof.

The substances which comprise this invention are of value as medicinal agents. They are in general useful antispasmodic, analgesic, antihistaminic and anesthetic agents. Their quaternary ammonium salts are surface-active substances having antiseptic and other valuable properties.

My invention is disclosed in more detail by the following examples, which are provided for the purpose of illustrating specific embodiments of the invention, but which are not to be construed as limiting the invention in spirit or in scope. The relative amounts of materials are given in parts by weight.

Example 1

A mixture of 708 parts of 9-propionyl-9,10-dihydroanthracene, 3500 parts of toluene, and 72 parts of sodium hydride is agitated and refluxed under nitrogen for about 15 hours. The mixture is cooled to about 20° centigrade and 530 parts of β-dimethylaminopropyl chloride are added. The mixture is agitated and refluxed for about 15 hours. The reaction mixture is then cooled and diluted with alcohol. It is extracted with dilute hydrochloric acid. The acid extract is made alkaline and extracted with ether. The ether extract is dried and evaporated. The residue of 9-β-dimethylaminopropyl-9-propionyl-9,10-dihydroanthracene is distilled at 195–203° C. at 3 mm. pressure. It has the formula

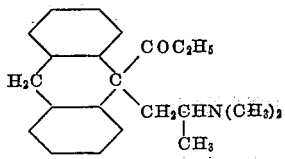

The citrate is prepared by dissolving 16 parts of the base and 10 parts of citric acid in a minimum amount of hot isopropanol. Upon chilling, crystals of 9-β-dimethylaminopropyl-9-propionyl-9,10-dihydroanthracene citrate separate. These are separated and recrystallized from isopropanol, and melt at 165–167° C.

By an analogous procedure employing 65 parts of β-diethylaminopropyl chloride instead of 53 parts of β-dimethylaminopropyl chloride, there is produced 9-β-diethylaminopropyl-9-propionyl-9,10-dihydroanthracene, which has the formula

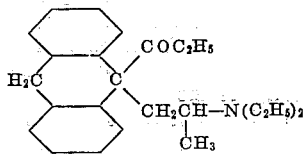

9-propionyl-9,10-dihydroanthracene is prepared by reacting 1 mole of 9,10-dihydroanthracene with about 1.5 moles of propionyl chloride in the presence of about 1 mole of aluminum chloride in an inert solvent such as tetrachloroethane or carbon disulfide. It distils at 175–180° C. at 3 millimeters pressure.

*Example 2*

A mixture of 130 parts of 9-propionyl-9,10-dihydroanthracene and 14.4 parts of sodium hydride in 865 parts of dry toluene is agitated and refluxed under nitrogen for about 15 hours. The mixture is cooled and 80 parts of β-dimethylaminoethyl chloride are added. The mixture is agitated and refluxed for about 15 hours. The base, 9 - β - dimethylaminoethyl - 9 - propionyl-9,10-dihydroanthracene, is isolated as in Example 1 and is distilled at 200–205° C. at 3 mm. pressure. It has the formula

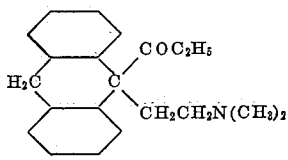

The citrate is formed by dissolving 15 parts of the base in hot isopropanol containing 9.8 parts of citric acid. On cooling, crystals of 9-β-dimethylaminoethyl - 9 - propionyl - 9,10 - dihydroanthracene citrate separate. These are removed and dried, and melt at 165–167° C.

By using 109 parts of β-piperidinoethyl chloride in place of the dimethylaminoethyl chloride in the foregoing process, one obtains 9-β-piperidinoethyl - 9 - propionyl - 9,10 - dihydroanthracene. This compound has the following formula

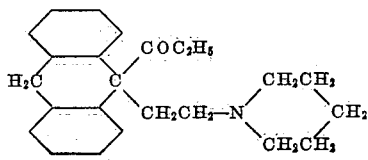

Similarly, by the use of 110 parts of β-morpholinoethyl chloride, there is produced 9-β-morpholinoethyl - 9 - propionyl - 9,10 - dihydroanthracene, having the formula

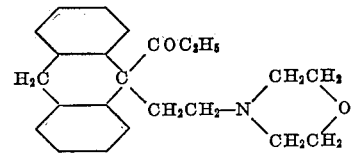

*Example 3*

9 parts of 9 - β - dimethylaminoethyl - 9 - propionyl - 9,10 - dihydroanthracene and 13.6 parts of methyl iodide are dissolved in about 40 parts of methyl ethyl ketone and placed in a closed vessel. The mixture is warmed for 30 minutes at 60–65° C. and then allowed to stand for about 15 hours. The resulting solution is diluted with a small amount of anhydrous ether to precipitate the β - (9 - propionyl - 9,10 - dihydro - 9 - anthryl) ethyl - trimethyl - ammonium iodide. This is removed by filtration, washed, and dried. It melts at 193–195° C.

*Example 4*

47 parts of 9-propionyl-9,10-dihydroanthracene and 5.2 parts of sodium hydride are stirred and refluxed in 260 parts of dry toluene in the presence of nitrogen for about 15 hours. The mixture is cooled to room temperature and 27 parts of β-diethylaminoethyl chloride are added. The resulting mixture is agitated and heated to reflux for 5–6 hours. The chilled mixture is diluted with 20 parts of alcohol. The solution is extracted with dilute hydrochloric acid. The acid extract is made alkaline and extracted with ether. The ether solution is dried with anhydrous potassium carbonate, filtered, and evaporated. The residue of 9-β-diethylaminoethyl-9-propionyl-9,10-dihydroanthracene distils at 207–210° C. at 3 mm. pressure. It has the formula

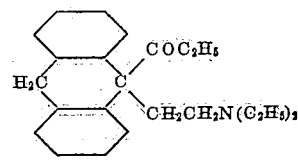

It forms an oily hydrochloride upon treatment of an ether solution of the base with anhydrous alcoholic hydrogen chloride. It forms a crystalline citrate in isopropanol. 9-β-diethylaminoethyl-9-propionyl -9,10 - dihydroanthracene citrate, upon recrystallization from alcohol, melts at 125–127° C.

*Example 5*

15 parts of 9-β-dimethylaminopropyl-9-propionyl - 9,10 - dihydroanthracene, 14 parts of methyl iodide, and 40 parts of methyl ethyl ketone are placed in a closed vessel maintained at about 22° C. for 15 hours and at 60–70° C. for ½ hour. Upon chilling, a precipitate of β-(9-propionyl-9,10-dihydro-9 - anthryl) isopropyl - trimethyl - ammonium iodide separates. This is filtered off and washed. It melts at 215–217° C.

*Example 6*

By a process similar to that of Example 2, using 122 parts of 9-acetyl-9,10-dihydroanthracene, 14.4 parts of sodium hydride and 80 parts of β-dimethylaminoethyl chloride, there is obtained 9 - β - dimethylaminoethyl-9-acetyl-9,10-dihydroanthracene, which has the formula

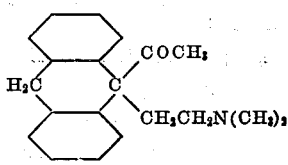

*Example 7*

234 parts of 9-acetyl-9,10-dihydroanthracene and 26 parts of sodium hydride are agitated in 2600 parts of refluxing toluene for 10 hours. The mixture is chilled and 250 parts of γ-di-n-butylaminopropyl bromide are added. The resulting mixture is refluxed and agitated vigorously for 14 hours. It is then chilled and extracted with dilute acid. The acidic extract is made alkaline and extracted with ether. The ether extract is dried and evaporated. The residue consists of almost pure 9-γ-di-n-butylaminopropyl-9-acetyl-9,10-dihydroanthracene, which has the formula

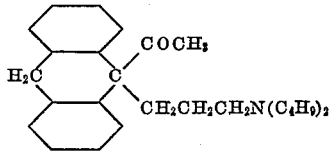

*Example 8*

By a process similar to that of Example 7, using 131 parts of 9-isobutyryl-9,10-dihydroanthracene (obtained by condensing 1 mole of dihydroanthracene with 1.48 moles of isobutyryl chloride in the presence of 0.98 mole of anhydrous aluminum chloride in carbon disulfide), 13 parts of sodium hydride and 70 parts of γ-dimethylaminopropyl chloride, there is obtained 9-γ-dimethylaminopropyl-9-isobutyryl - 9,10 - dihydroanthracene. This compound has the formula

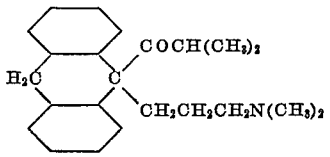

*Example 9*

A mixture of 236 parts of 9-propionyl-9,10-dihydroanthracene and 40 parts of powdered sodamide in 1700 parts of dry toluene is agitated and refluxed for 12–15 hours. The mixture is brought to room temperature and 155 parts of β-methylethylaminoethyl chloride are added. The resulting mixture is refluxed with agitation for about 15 hours. The chilled mixture is diluted with a small amount of alcohol to destroy any excess sodamide. It is then extracted with dilute acid and the acid extract is made alkaline. This is extracted with ether and the ether extract is dried and stripped of solvent. The residue of 9-β-methylethylaminoethyl-9-propionyl-9,10-dihydroanthracene is distilled under reduced pressure. It has a boiling range of about 204–208° C. at 3 mm. pressure. It has the following structure

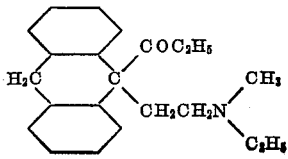

I claim:
1. A member of the group consisting of an organic base and salts thereof, said organic base being 9-aminoalkyl-9-alkanoyl -9,10- dihydroanthracene having the formula

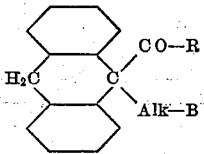

wherein R is an alkyl radical containing from 1 to 5 carbon atoms, Alk is an alkylene radical containing from 2 to 4 carbon atoms and B is a basic radical selected from piperidino, morpholino and dialkylamino radicals wherein the alkyl radicals contain from 1 to 5 carbon atoms.

2. A 9 - dialkylaminoalkyl - 9 - alkanoyl - 9,10-dihydroanthracene having the formula

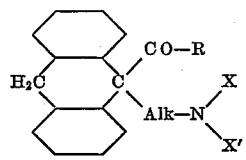

wherein R, X and X' are alkyl radicals containing from 1 to 5 carbon atoms and Alk is an alkylene radical containing from 2 to 4 carbon atoms.

3. A 9 -β- dialkylaminoalkyl -9- alkanoyl-9,10-dihydroanthracene wherein the alkyl radicals contain from 1 to 5 carbon atoms, the alkylene radical contains from 2 to 4 carbon atoms, and the alkanoyl radical contains from 2 to 6 carbon atoms.

4. A 9 -β- dialkylaminoethyl -9- alkanoyl-9,10-dihydroanthracene wherein the alkyl radicals contain from 1 to 5 carbon atoms and the alkanoyl radical contains from 2 to 6 carbon atoms.

5. A 9-β-dialkylaminopropyl-9-alkanoyl-9,10-dihydroanthracene wherein the alkyl radicals contain from 1 to 5 carbon atoms and the alkanoyl radical contains from 2 to 6 carbon atoms.

6. A 9-β-dialkylaminoethyl-9-propionyl-9,10-dihydroanthracene wherein the alkyl radicals contain from 1 to 5 carbon atoms.

7. A 9-β-dialkylaminopropyl-9-propionyl-9,10-dihydroanthracene wherein the alkyl radicals contain from 1 to 5 carbon atoms.

8. 9 -β- dimethylaminoethyl -9- propionyl-9,10-dihydroanthracene.

9. 9-β-dimethylaminopropyl-9-propionyl-9,10-dihydroanthracene.

10. 9 - β - dimethylaminopropyl - 9 - propionyl-9,10-dihydroanthracene citrate.

11. 9 - β - dimethylaminopropyl - 9 - propionyl-9,10-dihydroanthracene methiodide.

12. The process of producing a 9-dialkylaminoalkyl-9-alkanoyl -9,10- dihydroanthracene which comprises heating between 80° and 150° C. a 9-alkanoyl - 9,10 - dihydroanthracene wherein the alkanoyl radical contains from 2 to 6 carbon atoms with a dialkylaminoalkyl halide wherein the alkyl radicals contain 1 to 5 carbon atoms and the alkylene radical contains from 2 to 6 carbon atoms in an inert solvent in the presence of an alkali metal hydride.

13. The process of producing a 9-β-dialkylaminopropyl - 9 - propionyl - 9,10 - dihydroanthracene which comprises heating between 80° and 150° C. 9-propionyl-9,10-dihydroanthracene with a β-dialkylaminopropyl halide wherein the alkyl radicals contain from 1 to 5 carbon atoms in an inert solvent in the presence of an alkali metal hydride.

14. The process of producing 9-β-dimethylaminopropyl - 9 - propionyl - 9,10 - dihydroanthracene which comprises heating between 80° and 150° C. 9-propionyl-9,10-dihydroanthracene with β-dimethylaminopropyl chloride in toluene in the presence of sodium hydride.

JOHN W. CUSIC.

REFERENCES CITED

The following references are of record in the file of this patent:

FOREIGN PATENTS

| Number | Country | Date |
|--------|---------|------|
| 61,463 | Denmark | Oct. 25, 1943 |

OTHER REFERENCES

Kleiderer et al., "P. B. 981," (Office of the Publication Board, Dept. of Commerce, Washington, D. C., July 1945), page 96, 96A, 97.